United States Patent
Johansson et al.

(10) Patent No.: US 9,785,772 B1
(45) Date of Patent: Oct. 10, 2017

(54) ARCHITECTURE FOR CENTRALIZED MANAGEMENT OF BROWSER ADD-ONS ACROSS MULTIPLE DEVICES

(71) Applicant: Amazon Technologies, Inc., Seattle, WA (US)

(72) Inventors: Jesper Mikael Johansson, Redmond, WA (US); Leon Robert Warman, Aptos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 14/502,644

(22) Filed: Sep. 30, 2014

(51) Int. Cl.
*G06F 21/50* (2013.01)
*G06F 21/56* (2013.01)

(52) U.S. Cl.
CPC .................................. *G06F 21/56* (2013.01)

(58) Field of Classification Search
CPC ................................ G06F 21/56; H04L 63/14
See application file for complete search history.

(56) References Cited

U.S. PATENT DOCUMENTS

| | | | | |
|---|---|---|---|---|
| 8,200,962 | B1 * | 6/2012 | Boodman | G06F 21/53 713/161 |
| 2015/0007330 | A1 * | 1/2015 | Gomez | G06F 21/577 726/25 |

* cited by examiner

*Primary Examiner* — Izunna Okeke
(74) *Attorney, Agent, or Firm* — Knobbe, Martens, Olson & Bear, LLP

(57) ABSTRACT

Features are disclosed for facilitating remote management of browser add-ons on multiple user computing devices from a centralized add-on management system. A browser application on the user computing devices may include an integrated application programming interface that can be remotely accessed by the add-on management system. In some embodiments, a management add-on or some other object that is separate from or otherwise not integrated with the browsing application may be used to facilitate the remote management of add-ons. Management of add-ons may include permitting and/or blocking installation and/or execution of particular add-ons on a case-by-case basis. The determination may be based on user permissions, add-on characteristics, observed execution of add-ons, and the like.

27 Claims, 5 Drawing Sheets

ARCHITECTURE FOR CENTRALIZED MANAGEMENT OF BROWSER ADD-ONS ACROSS MULTIPLE DEVICES

BACKGROUND

Modern enterprises typically use computing devices (e.g., servers, desktop computers, mobile devices, etc.) for a variety of tasks. The computing devices are often networked to communicate with each other and with computing devices outside of the enterprise. Many enterprises implement security features to limit or otherwise control how users use the computing devices. For example, network settings may be configured and/or management software may be deployed to limit which applications can be installed on the computing devices or to otherwise limit how computing devices can be used. In this way, enterprise information technology ("IT") departments can manage the use of enterprise computing resources and reduce the risk of attack from malicious or unauthorized software.

Web browser applications, also referred to simply as "browsers," are software applications that allow computing devices to interact with other computing devices to retrieve content, exchange information, etc. Many browsers allow the use of auxiliary components that are not part of the browser itself, but which extend the functionality of the browser in some way. Such auxiliary components are referred to as add-ons, plug-ins, snap-ins, extensions, skins, themes, and the like. Because add-ons typically require a browser in order to execute, many add-ons do not go through the same installation process as stand-alone applications (e.g., they do not require "administrator" privileges on the computing device on which they are installed). To provide additional security and control by enterprise IT departments, some browsers allow the installation or execution of add-ons to be blocked altogether.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
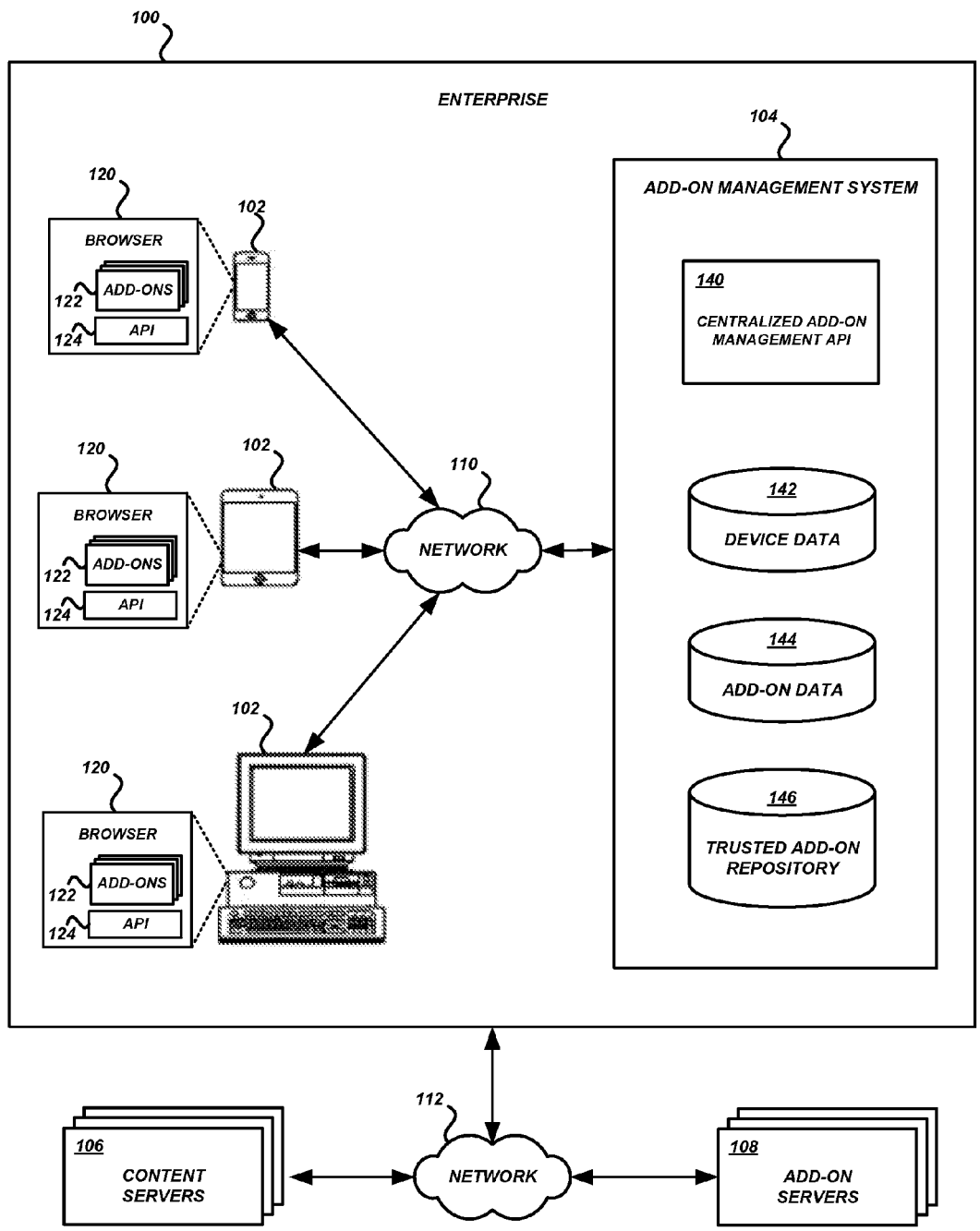
FIG. 1 is a block diagram of an illustrative enterprise environment including a centralized add-on management system according to some embodiments.

The present disclosure is directed to a system for centralized management of auxiliary modules and applications that extend the functionality of web browser applications and/or provide additional features to web browser applications. Such auxiliary modules and applications are often referred to as plug-ins, snap-ins, extensions, toolbars, widgets, skins, themes, etc., and will be referred to herein using the umbrella term "add-ons." Illustratively, some of the features provided or enhanced through the use of add-ons include playback of multimedia content (e.g., as provided by the Flash add-on), viewing documents (e.g., as provided by the Acrobat Reader add-on), scanning for viruses, changing the appearance of the browser, and providing program execution environments (e.g., as provided by the Java Virtual Machine add-on).

Although add-ons provide additional or enhanced features to web browser applications, add-ons may also increase the software attack surface of the computing devices on which they are installed. The software attack surface of a computing environment generally refers to the collection of points at which a user or process can perform some malicious, unauthorized, or otherwise unwanted activity on a computing device, including execution of viruses and other malware, extraction or manipulation of data, and the like. For example, applications, application modules, system services, input fields, communication protocols, application programming interfaces ("APIs"), and the like all contribute to the attack surface of a computing environment by providing points at which a user or process can perform some unwanted activity. Environments with more such components have larger attack surfaces than environments with fewer such components. Enterprises with multiple computing devices (e.g., tens, hundreds, thousands or more individual computing devices) typically implement some form of centralized security system to reduce the attack surface of the enterprise. However, because browser add-ons are typically able to be installed and/or executed by users without administrator permission, the add-ons may fall outside the purview of such centralized enterprise security systems. Therefore, browser add-ons can present a pervasive security risk to individual computing devices and the enterprise as a whole, particularly when the volume, ease of installation, and uncertain quality and reliability of browser add-ons are considered.

Some aspects of the present disclosure relate to integration of add-on management features into a browser application such that a remote server or system (e.g., a computing device or system separate from the computing device on which the browser is installed) can manage browser add-ons installed and used on multiple computing devices. In this way, enterprises can centrally manage the add-ons that are installed and/or used on computing devices within the enterprise or on computing devices associated with the enterprise, thereby improving stability and security of the enterprise computing environment. In some embodiments, centralized management of add-ons includes: detecting which add-ons are installed on the various computing devices of the enterprise; maintaining a list of add-ons that are installed on each computing device (or some subset thereof); generating and maintaining lists of trusted or approved add-ons (also referred to as "whitelists"); generating and maintaining lists of blocked or unauthorized add-ons (also referred to as "blacklists"); maintaining a repository of trusted or approved add-ons to be distributed among or otherwise accessed by the computing devices of the enterprise; obtaining copies of add-ons installed on user devices so that the add-ons can be inspected; and/or blocking execution of particular add-ons in connection with display of particular network-based content (e.g., web pages). In some embodiments, these and other management features can be facilitated by an API exposed by the browser applications installed on the user computing devices being managed. In this way, a remote device (e.g., a centralized add-on management server or an administrator computing device) may communicate with and instruct the user computing devices via the API to block, remove, and authorize particular add-ons, or to perform some other add-on-related management activity.

Additional aspects of the present disclosure relate to the centralized management of browser add-ons outside of the enterprise environment. In some embodiments, a browser developer or some other entity may remotely provide browser add-on management services from a central location for paying customers, the general public, or some other group of users. Users may obtain a browser application with an integrated API for remote browser add-on management. The users may then proceed to use the browser to request and interact with content, install and use browser add-ons, etc. An entity associated with the browser (e.g., a developer or distributor of the browser) or with the users (e.g., a service provider contracted by the users/customers) can remotely access the API on the user devices to manage the add-ons installed and executed on the user devices. The entity may provide such remote browser add-on management services for multiple users or devices (e.g., thousands or millions of individual users or devices), performing management services similar to those describe elsewhere herein with respect to enterprises. In some embodiments, the entity may leverage its position as a centralized add-on management service for many individual devices by tracking add-on installation and usage information across the entire customer base (or some subset thereof), analyzing the information and installed add-ons, and detecting vulnerabilities, malicious add-ons, and the like. The entity can then remotely instruct the user devices to block or remove add-ons associated with security risks, add-ons that are incompatible with other applications installed on the user devices, etc.

Further aspects of the present disclosure relate to the remote management of browser add-ons for multiple computing devices by using an application or module that is not integrated into the browser application itself, but which is obtained or provided separately from the browser application. In some embodiments, remote browser add-on management functionality may be provided for conventional browser applications (e.g., applications without integrated APIs for remote add-on management). For example, a separate application or component, such as a "master add-on," can be installed on user devices. The master add-on can provide an API that can be used by a remote add-on management system to manage add-ons installed and/or used on the user device and multiple other user devices. In this way, centralized add-on management may be provided to multiple user devices that may use different browser applications.

Although aspects of the embodiments described in the disclosure will focus, for the purpose of illustration, on centralized management of browser add-ons installed and/or used on multiple user computing devices, one skilled in the art will appreciate that the techniques disclosed herein may be applied to any number of services, process, or applications. For example, add-ons and other auxiliary modules and components for applications other than browser applications may be managed according to the architecture and techniques described herein. Various aspects of the disclosure will now be described with regard to certain examples and embodiments, which are intended to illustrate but not limit the disclosure.

Example Centralized Add-On Management Environments

FIG. 1 shows an example enterprise environment in which features of the present disclosure can be implemented according to some embodiments. The enterprise environment 100 includes various user devices 102 and an add-on management system 104 in communication via a network 110. For example, the enterprise 100 may be a company with multiple user computing devices 102. Employees of the company may use the user computing devices 102 to perform various job-related and personal tasks, including accessing and interacting with content using a browser application 120 and various browser add-ons 122. In order to improve security of the enterprise 100 and prevent users from installing and/or executing unauthorized add-ons, the browser 120 may include an integrated API 124 that allows a remote system, such as the add-on management system 104, to manage the browser add-ons 122 of the user computing device 102 as described in greater detail below.

The user computing devices 102 can correspond to a wide variety of computing devices, including desktop computing devices, laptop computing devices, terminal devices, mobile phones, tablet computing devices, media players, wearable computing devices (e.g., smart watches, smart eyewear, etc.), and various other electronic computing devices and appliances having one or more computer processors and a computer-readable memory storing an executable browser 120. As shown, the browser 120 may include an integrated API 124 that facilitates remote management of add-ons as described herein. In some embodiments, a non-integrated API (e.g., a stand-alone application or module), a configuration file, or some other mechanism may be used instead of, or in addition to, an integrated API 124 to facilitate the remote management of add-ons described herein.

The user computing devices 102 may further include or obtain one or more browser add-ons 122. Individual browser add-ons 122 may consist of one or more electronic files and associated system settings stored on the user computing device 102 (e.g., on a hard disk or other persistent storage). When the browser application 120 is executed, the add-ons 122 may be automatically loaded into memory for execution by the processor(s) of the user computing device 102, or the add-ons 122 may be loaded in response to certain commands, such as commands originating from a user, from content obtained by the browser 120, from the browser 120 itself, from the operating system of the user computing device 102, etc. Illustratively, the browser add-ons 122 may execute on the user computing device 102 in the same process space as the browser application 120 or otherwise under control of the browser 120. In some embodiments, add-ons 122 may execute in conjunction with the browser application 120 but may not be contained within or otherwise under the control of the browser application 120. Some or all of the browser add-ons 122 may not be developed, provided, hosted, offered and/or otherwise associated with the entity or entities that developed or provided the browser 120 and/or the add-on management system 104. Rather, individual browser add-ons 122 may instead by developed, provided, hosted, offered, and/or otherwise associated with a separate entity altogether (e.g., a separate computing product and/or service provider).

The add-on management system 104 can be a computing system configured to manage add-ons installed, executed, and/or otherwise accessible to the user computing devices 102 of the enterprise 100. For example, the add-on management system 104 can be a server or group of servers that may be accessed via the network 110. The add-on management system 104 can include a number of components to provide various features described herein, such as a centralized add-on management API 140 that can be accessed by an administrator or other user to manage add-ons installed on user computing devices 102 in the enterprise 100. The add-on management system 104 may also include various data stores, such as a device data store 142 to store information about each of the user computing devices 102 (or some subset thereof) of the enterprise 100, an add-on data store 144 to store information about the various add-ons installed on the user computing devices 102 or otherwise available for installation, and a trusted add-on repository 146 to store various add-ons that have been approved for installation and use by the user computing devices 102.

The add-on management system 104 may be a single computing device, or it may include multiple distinct computing devices, such as computer servers, logically or physically grouped together to collectively operate as a server system. The components of the add-on management system 104 can each be implemented as hardware, such as a server computing device, or as a combination of hardware and software. In addition, the components of the add-on management system 104 can be combined on one server computing device or separated individually or into groups on several server computing devices. In some embodiments, the add-on management system 104 may include additional or fewer components than illustrated in FIG. 1.

The network 110 may be a private local area network (LAN) or wide area network (WAN), such as a corporate network or university network. Individual user computing devices 102 of the enterprise 100 may communicate with various computing devices and networks outside of the enterprise 100. For example, as shown, the enterprise 100 may be in communication with various content servers 106 and add-on servers 108 via a second network 112. The network 112 may be a publicly accessible network of linked networks, possibly operated by various distinct parties, such as the Internet. In some embodiments, either or both of the networks 110, 112 may be or include the Internet, a private network, personal area network, local area network, wide area network, cable network, satellite network, cellular telephone network, etc. or combination thereof.

Figure 2:
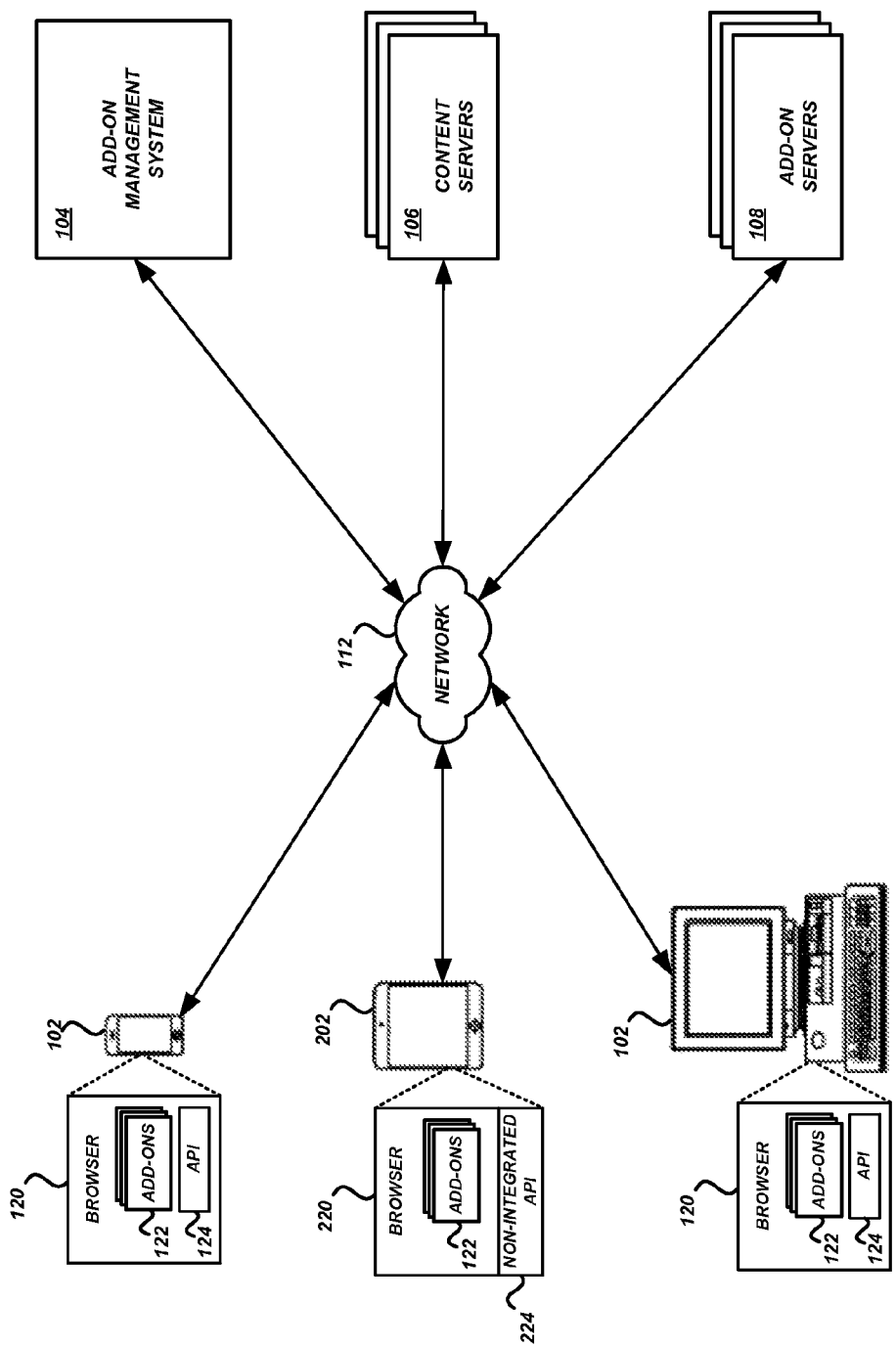
FIG. 2 is a block diagram of an illustrative network environment including a centralized add-on management system according to some embodiments.

FIG. 2 shows an example network environment in which add-on management features may be implemented outside of an enterprise. In some embodiments, a browser developer or some other entity may remotely provide browser add-on management services from a central location for paying customers, the general public, or some other group of users. For example, the add-on management system 104 may be implemented as a network-accessible service (e.g., a "cloud" service that includes one or more modules, such as virtual machines, executing on hardware, such as server computing devices in a data center) that remotely (e.g., via the internet) manages the browser add-ons obtained, installed, executed, or otherwise used by a group or groups of user devices. The network-accessible service may be used to remotely manage add-ons for an organization (e.g., a school or business), a family, or a group of un-associated customers as described herein with respect to enterprises.

Users may obtain a browser application 120 for use on user computing devices 102. The browsers 120 may include integrated APIs 124 for remotely managing add-ons installed and/or used with the browsers 120. The browsers 120 may be designed to be managed by a particular provider of browser add-on management services (e.g., the developer or distributor of the browser 120), or users may associate their respective browser applications 120 with particular browser add-on management service providers (e.g., as paying customers or for some other consideration).

As shown in FIG. 2, the user computing devices 102 can obtain content and add-ons via network 112 from content servers 106 and add-on servers 108. In addition, user computing devices 102 may communicate with a centralized add-on management system 104 via network 112. The add-on management system 104 can remotely access the API 124 on the user devices 102 to manage the add-ons 122 installed and executed on the user devices 102.

The add-on management system 104 may have various components and data stores for providing centralized add-on management features, as described with respect to FIG. 1. For example, the add-on management system 104 may have a device data store and an add-on data store. The add-on management system 104 may provide a centralized add-on management service for many individual user devices 102 by obtaining information regarding installations and usage of add-ons 122 across the entire customer base (or some subset thereof) and storing the information in its various data stores. The add-on management system 104 can analyze the information to detect vulnerabilities, malicious add-ons, and the like, and then remotely instruct the user devices 120 via the API 124 (or some other method) to block or remove add-ons associated with security risks, add-ons that are incompatible with other applications installed on the user devices, etc.

In some embodiments, the add-on management system 104 may manage add-ons used with browser applications that do not have integrated APIs or other functionality that facilities remote management of add-ons. For example, as shown, a user device 202 with a conventional browser 224 may use an auxiliary application or module such as an API 224 that is not integrated into the browser application 220 itself, but which is obtained or provided separately from the browser application 220. In some embodiments, remote browser add-on management functionality may be provided by a "master add-on" that can be installed on user devices. The master add-on can provide an API that can be used by an add-on management system 104 to manage add-ons installed and/or used on the user device 102 and multiple other user devices. In this way, centralized add-on management may be provided to multiple user devices that may use different browser applications.

Centralized Management of Add-Ons Across Multiple Devices

Figure 3:
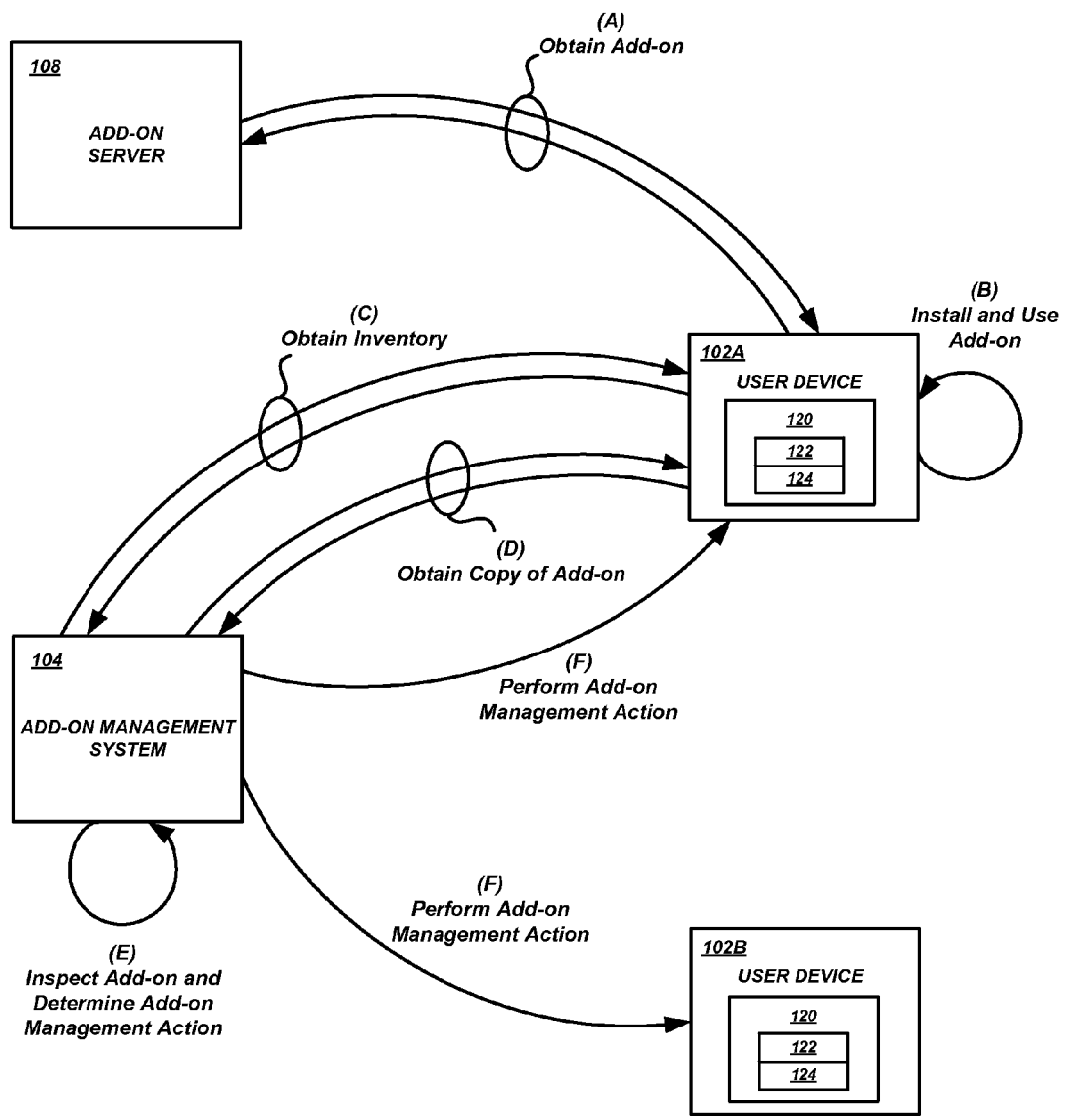
FIG. 3 is a block diagram of illustrative communications and interactions between client devices and a centralized add-on management system according to some embodiments.

FIG. 3 shows example interactions and data flows between multiple user computing devices 102A and 102B, an add-on management system 104, and an add-on server 108. A user of a user computing device 102A may launch a browser application 120 and establish communication with an add-on server 108. The add-on server 108 may be a server that is located outside of the enterprise 100 and is accessible via network 112. Illustratively, the add-on server 108 may be or include a content server that provides electronic content (e.g., web pages) and also provides one or more add-ons for use with browser applications, such as the browser 120.

At (A), the user may cause the user computing device 102A to obtain an add-on from the add-on server 108. The add-on 122 may be obtained in the form of one or more electronic files transmitted via the network 112. At (B), the user computing device 102A may install and use the add-on 122. In many cases, administrator or other heightened permissions are required to install stand-alone applications, because installation of stand-alone applications usually involves copying files into secure system directories, adding and/or modifying registry entries, or otherwise performing operations that may alter the manner in which the computing system operates. In contrast, installation of an add-on 122 may not include some or all of the operations described above with respect to stand-alone applications, and therefore may not require administrator permissions.

In use, an add-on 122 typically executes in the same computing process as the browser application 120, or in a process under control of the browser application 120. Although the add-on 122 is generally contained within or otherwise under the control of the browser application 120, the add-on 122 may nevertheless provide features and functionality akin to the features and functionality provided by a stand-alone application. In addition, the add-on 122 may have access to portions of the computing system which are secure, even though no administrator permissions were required for installation or initialization. Thus, a malicious add-on (or a malicious software process using the add-on as an attack vector) may perform various unauthorized or otherwise unwanted actions on the computing device 102A. In some cases, a poorly designed or tested add-on may cause system instabilities in the absence of malicious or other intentionally harmful activities.

At (C), the add-on management system 104 may connect to the user device 102A and obtain an inventory of add-ons installed and/or executing on the user device 102A. The add-on management system 104 may perform such an operation on a predetermined or dynamically determined schedule, on demand by a system administer of the enterprise 100, or in response to some other event, such as a notification from the user device 102A that a new add-on 122 has been installed. The add-on management system 104 may obtain a copy of the add-on 122 at (D) for further inspection at (E). The add-on management system 104 may obtain a copy of the add-on from the user device 102A, a different user device, the add-on server 108 from which the user device 102A obtained the add-on, a different add-on server (e.g., a server that is managed or approved by the add-on management system 104 or the enterprise), etc. In some embodiments, the add-on management system 104 may execute the add-on 122 in a sandbox environment to observe the manner in which the add-on 122 executes. For example, a system administrator may review the add-on inventory of the user device 102A and identify the newly installed add-on 122 as unknown (e.g., neither approved nor blocked). The administrator may launch the add-on 122 in a secure, sandbox environment and monitor its execution to determine whether to block the add-on 122 from being used on the user device 102B and/or other user devices, whether to require a user initializing the add-on to have heightened permissions (e.g., administrator), or the like. In some embodiments, the API 124 may enable the add-on management system to collect crash report data, performance data, or other information about add-ons from the user computing device 102. Such information may be used instead of, or in addition to, inspection of add-ons executing in a sandbox environment when determining how to manage individual add-ons.

At (F), the add-on management system 104 may perform an add-on management action, such as blocking installation or execution of the add-on, authorizing installation or execution of the add-on, replacing the add-on with an approved add-on, making configuration changes to the add-on, etc. In some embodiments, the add-on management system may, in response to determining that the add-on 122 is malicious, unstable, or otherwise harmful or unauthorized, instruct the user device 102A that the add-on 122 is blocked. For example, the add-on management system 104 may use the remote add-on management API 124 integrated into the browser 120 to instruct the user device 102A to stop executing the add-on 122 and/or delete the add-on 122. In addition, the add-on management system 104 may instruct other user devices, such as user device 102B, to stop executing the add-on 122 and/or delete the add-on 122. The instruction to user device 102B in this example is based on a determination made regarding the add-on 122 as received from a separate user 102A. In addition, the add-on may be added to a "blacklist" maintained in the add-on data store 144 of the add-on management system 104. In this way, the add-on management system 104 can leverage its position as a centralized add-on management system for multiple devices in order to improve the security and overall computing environments of its potentially disparate and unrelated customers.

The examples of add-on management actions described herein are illustrative only, and are not intended to be limiting. In some embodiments, additional or alternative add-on management actions may be performed or initiated. For example, an add-on management system 104 may maintain a cross-reference listing of certain known add-ons and preferred alternative add-ons, such as known add-ons associated with security risks or unacceptable performance, and preferred alternatives that provide the same or similar functionality without the same security risks and/or unacceptable performance. The management system may use the cross-reference list to look up an add-on that has been obtained/installed/executed by user device, or for which a request to obtain/install/execute has been received from a user device. The add-on management system 104 can determine whether an alternative is listed in the cross-reference listing, and perform an add-on management action to force the user computing device (and, in some cases, other user computing devices) to use the alternative add-on in place of the add-on.

In some embodiments, management of add-ons can include quarantining devices with new add-ons. Many user devices, such as laptops, smart phones, tablets, and other mobile devices, spend periods of time connected to networks other than (or in addition to) the enterprise network. When a user device has been connected to a different network (or simply disconnected from the enterprise network) for some predetermined or dynamically determined period of time and later attempts to re-connect to the enterprise network, the user device may be queried by the add-on management system 104 for an inventory of currently installed add-ons, or the user device may be configured to automatically submit an inventory of currently installed add-ons. The inventory can be analyzed and used to determine, at least in part, whether to permit the user device to re-connect to or otherwise use the enterprise network. For example, such an add-on quarantine process may be part of a comprehensive quarantine process implemented for an enterprise network.

Example Process for Allowing Add-on Management from a Remote Management System

Figure 4:
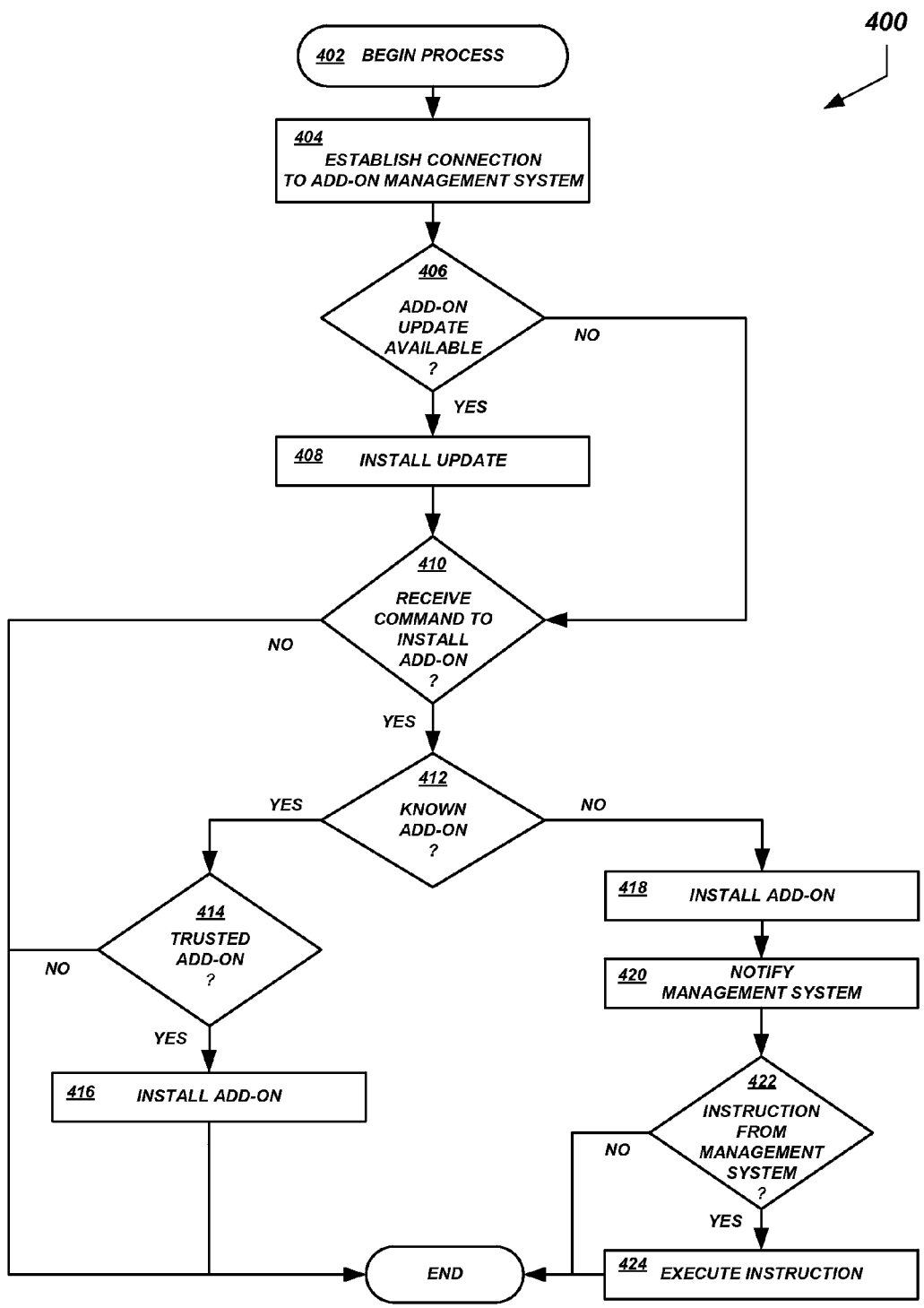
FIG. 4 is a flow diagram of an illustrative process for allowing an add-on management system to remotely manage add-ons on a user computing device.

FIG. 4 illustrates a sample process 400 that may be used by a browser application 120 with an integrated API 124, or by a master add-on or some other auxiliary client-side component, to allow remote management of add-ons installed and/or used on a user device 102.

The process 400 begins at block 402. For example, the process 400 may begin automatically upon user initiation of a browsing session by launching a browser application 120 on a user computing device 102. For convenience, many portions of the process 400 will be described as initiated by or otherwise involving the browser 120. However, it will be appreciated that many of such operations can be initiated by or otherwise involve an integrated API 124 (if any), a master add-on for remote add-on management (if any), or some other module, component, or application designed to facilitate the remote management of add-ons on a user device 102.

At block 404, the browser 120 can establish a connection with an add-on management system 104. The browser 120 may do so at the beginning of each browsing session, at predetermined or dynamically determined intervals during a browsing session, once in every n browsing sessions (where n is some positive integer or ratio), etc.

At decision block 406, the browser 120 can determine whether an update is available for one or more add-ons currently installed on the user device 102. The determination may be made at the initiation of the browser 120 (e.g., by sending a request for available updates), or it may be made in response to some notification from the add-on management system 104. If one or more updates are available, they can be installed at block 408. The installation may be performed by retrieving an approved update from the add-on management server 102, or by contacting an add-on server 108 directly. In some embodiments, the add-on management server 104 may also or alternatively notify the browser 120 that one or more previously-installed add-ons are now blocked. In response to such a notification, the browser 120 can disable or remove the blocked add-ons.

At decision block 410, the browser 120 can determine whether a command to install an add-on has been received during the browsing session. For example, a user may navigate to a content page provided by a content server 106, an add-on server 108, or some other network resource. The user may then request installation of an add-on hosted by the server, linked from the content page, or otherwise accessible to the user. If such a command is received by the browser 120, the process 400 can proceed to decision block 412. If no such command is received, the process 400 may terminate (e.g., at the end of the browsing session).

At decision block 412, if the add-on to be installed is known to the add-on management system 104, the process 400 may proceed to block 414; otherwise, the process 400 may proceed to block 418. For example, the browser 120 may notify the add-on management system 104 that a command to install the add-on has been received, or the browser 120 may query the add-on management system 104 for information about the add-on to be installed (e.g., whether the add-on is trusted/whitelisted or blocked/blacklisted). The add-on management system 104 may, in response to such a notification or query, instruct the browser 120 regarding whether the add-on is trusted, blocked, or unknown. In some embodiments, add-ons may be trusted and/or blocked on a user-by-user basis or on a user-group basis rather than being trusted and/or blocked altogether. For example, individual users (or user devices 102) may be assigned to roles or permission levels that allow installation of add-ons, while users assigned to other roles or permission levels are not allowed to install the same add-ons. The roles may be based on, e.g., the information or system resources that the individual users have access to, how the information or system resources may be affected by exposure to add-ons, etc. In some embodiments, add-ons may be tagged or grouped according to various characteristics of the add-ons, such as which browser-level and/or system-level permissions are needed by the add-ons. Users may then be permitted or blocked from installing add-ons based on the roles or permission levels to which the users are assigned, the extent to which those roles or permission levels correspond to the permissions required by the add-ons in question, and so on.

At decision block 414, if the browser 120 is notified or otherwise determines that the add-on is trusted, the add-on may be installed at block 416. However, if the browser 120 is notified or otherwise determines that the add-on is blocked, the process 400 may terminate. In some embodiments, the user may be notified that the add-on is blocked and will therefore not be installed. In further embodiments, if the user is an administrator or otherwise has permission to install blocked add-ons, then the user may override the determination and install the add-on.

At block 418, when the browser has been notified or otherwise determines that the add-on is not trusted or blocked, the browser 120 may install the add-on. In addition, the browser 120 may notify the add-on management system 104 of the installation, and provide information about the add-on (e.g., version information, source, a copy of the add-on, etc.).

At decision block 422, if an instruction from the add-on management system 104 is received, the process 400 may proceed to block 424 to execute the instruction. For example, the instruction may be to block the newly installed add-on (e.g., after a determination has been made that the add-on is malicious or is otherwise not to be used), to run the newly-installed add-on in a safe environment (e.g., in a sandbox environment or in some heighted-security environment), to only allow certain users or user associated with certain roles or permissions to execute the add-on, to install or otherwise use the add-on with only certain configuration settings, to replace the add-on with a preferred alternative add-on, etc.

Although the description above focuses on installation of add-ons, the process 400 can be used to manage execution of add-ons instead of, or in addition to, installation of add-ons. For example, a browser 120 may notify an add-on management server 104 about commands received by the browser 120 to execute previously-installed add-ons. The management server 104 can notify the browser 120 that the add-on is trusted, blocked or unknown, and the browser 120 may proceed accordingly. The determination of whether an add-on is trusted or blocked from execution may be based on the roles or permissions to which the user is assigned and/or the characteristics of the add-ons, as described above.

Example Process for Remotely Managing Add-Ons

Figure 5:
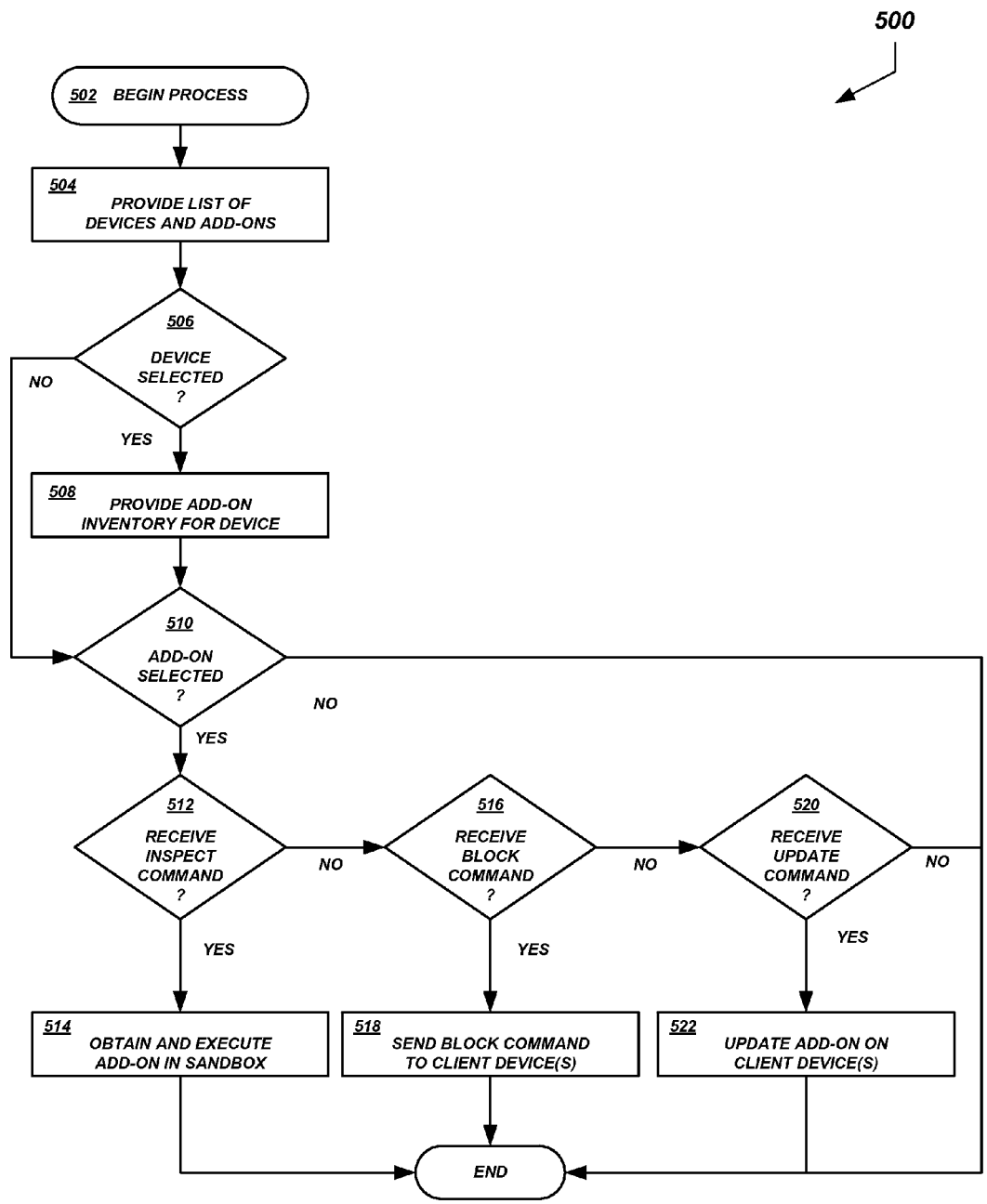
FIG. 5 is a flow diagram of an illustrative process for remotely managing add-ons of user computing devices by a centralized add-on management system.

FIG. 5 illustrates a sample process 500 that may be used by an add-on management system 104 to remotely manage add-ons installed and/or used by user devices 102.

The process 500 begins at block 502. In some embodiments, the process 500 may begin automatically upon initiation of an add-on management session by a user of the add-on management system 104. The user may be a system administrator, technician, or some other interested party who connects to the add-on management system 104 from a separate user computing device 102, or who interacts with the add-on management system 104 directly.

At block 504, the add-on management system 104 can provide a list of user devices 102 managed by the add-on management system 104 and/or a list of add-ons known to the add-on management system 104.

At decision block 506, if the administrator selects a particular user device 102 managed by the add-on management system 104, an inventory of add-ons installed on that device 102 can be presented to the administrator at block 508. Illustratively, the inventory may be created and maintained via communication with the user device 102, such as the communications detailed above with respect to FIG. 4. In some embodiments, add-on inventories may be communicated by user devices 102 to the add-on management system 104 on a predetermined or dynamically determined schedule, or upon request by the add-on management system 104, rather than over the course of installation of individual add-ons.

At decision block 510, if the administrator selects a particular add-on 102 installed on the user device selected above, or otherwise known to the management system 102 (e.g., if no user device 102 was selected above), the process 500 can proceed to decision block 512. Otherwise, the process 500 can terminate.

At decision block 512, if the add-on management system 104 receives a command to inspect the add-on, the process can proceed to block 514 where the add-on is executed. In some embodiments, add-ons can be obtained from user devices 102 and executed in a sandbox environment where they can be tested and observed. Information regarding execution of the add-ons can be stored (e.g., in the add-on data store 144) for use in subsequent processes, such as execution of blocks 516 and 518, below.

At decision block 516, if the add-on management system 104 receives a command to block installation, execution, or other usage of a particular add-on, the process 500 can proceed to block 518 where the add-on is blocked. Add-ons can be blocked by adding them to a blacklist, which is accessible by or distributed to user computing devices 102. In some embodiments, add-ons can be blocked by transmitting instructions or notifications to user computing devices 102 that the add-ons should be uninstalled, deleted, disabled, etc.

At decision block 520, if the add-on management system 104 receives a command to update a particular add-on, the process 500 can proceed to block 522 wherein the add-on is updated. The add-on may be updated in a repository of add-ons managed by the add-on management system 104, such as the trusted add-on repository 146. In some embodiments, the add-on management system 104 can instruct user computing devices 102 to obtain an updated version of an add-on (e.g., from the add-on management system 104 or directly from the corresponding add-on server 108), as described above with respect to FIG. 4.

The commands illustrated in FIG. 5 and described above are illustrative only, and are not intended to be limiting. In some embodiments, additional or alternative commands may be received and acted upon by the add-on management system 104, such as commands to authorize installation or execution of the add-on, replace the add-on with an approved add-on, make configuration changes to the add-on, record a current user (and/or user device) as a user of the add-on, permit or block use of the add-on for a period of time, permit or block use of the add-on subject to certain conditions or other criteria (e.g., only when a user device is using a particular network connection), etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the processes 400 and 500 described with respect to FIGS. 3 and 4 may be embodied in a set of executable program instructions stored on one or more non-transitory computer-readable media, such as one or more disk drives or solid-state memory devices, of the user device 102 or a computing system with which the add-on management system 104 is associated. When a process 400 or 500 is initiated, the executable program instructions can be loaded into memory, such as RAM, and executed by one or more processors of the user device or computing system. In some embodiments, the computing system may include multiple computing devices, such as servers, and the processes or portions thereof may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   an add-on management system comprising at least one server computing device, the add-on management system configured to manage usage of browser add-ons on user computing devices by at least:
      obtaining information from a first user computing device of the user computing devices regarding at least a first browser add-on of the browser add-ons;
      obtaining a copy of the first browser add-on based at least partly on the information;
      executing the copy of the first browser add-on;
      analyzing execution of the copy of the first browser add-on during performance of one or more operations; and
      determining that usage of the first browser add-on is to be blocked on at least a second user computing device of the user computing devices based at least partly on the analysis of the execution of the copy of the first browser add-on; and
   a browser application that runs on the user computing devices, the browser application configured to provide an application programming interface by which the add-on management system manages usage of the browser add-ons on the user computing devices by, in response to determining that usage of the first browser add-on is to be blocked, instructing the browser application executing on the second user computing device that usage of the first browser add-on is to be blocked;
   wherein individual browser add-ons of the browser add-ons comprise an auxiliary executable component, separate from the browser application, that executes at least partly under control of the browser application to add functionality to the browser application.

2. The system of claim 1, wherein individual browser add-ons of the browser add-ons comprise a plug-in, snap-in, extension, toolbar, widget, skin or theme.

3. The system of claim 1, wherein usage of a browser add-on comprises execution of the browser add-on, interaction with the browser add-on, installation of the browser add-on, or retrieval of the browser add-on.

4. Non-transitory computer-readable storage having stored thereon a browser module configured to execute a process on a user computing device, the process comprising:
   establishing communications with an add-on management system comprising one or more computing devices separate from the user computing device, wherein the add-on management system is configured to manage usage of browser add-ons on a plurality of user computing devices;
   providing a copy of a first browser add-on to the add-on management system;
   determining that the first browser add-on is not permitted to be used on the user computing device based at least partly on first information received from the add-on management system; and
   determining that a second browser add-on is not permitted to be used on the user computing device based at least partly on second information received from the add-on management system, wherein the second information is based at least partly on an analysis, performed by the add-on management system, of execution of a copy of the second browser add-on during performance of one or more operations, wherein the copy of the second browser add-on is received by the add-on management system from a second user computing device.

5. The non-transitory computer-readable storage of claim 4, wherein the browser module comprises one of: a browser application with an integrated add-on management application programming interface; a browser add-on; or a standalone application separate from a browser application.

6. The non-transitory computer-readable storage of claim 4, wherein at least one of the first browser add-on and second browser add-on comprises an auxiliary executable component, separate from a browser application executing on the user computing device, that executes at least partly under control of the browser application to add functionality to the browser application.

7. The non-transitory computer-readable storage of claim 4, wherein at least one of the first browser add-on and second browser add-on comprises a plug-in, snap-in, extension, toolbar, widget, skin or theme.

8. The non-transitory computer-readable storage of claim 4, wherein determining that the first browser add-on is not permitted to be used on the user computing device is further based at least partly on information regarding a user of the user computing device.

9. The non-transitory computer-readable storage of claim 4, wherein determining that the first browser add-on is not permitted to be used on the user computing device is further based at least partly on information regarding an operational characteristic of the first browser add-on.

10. The non-transitory computer-readable storage of claim 4, the process further comprising transmitting a list of browser add-ons installed on the client device to the add-on management system.

11. The non-transitory computer-readable storage of claim 4, wherein the first information comprises a blacklist of add-ons not permitted to be used on the user computing device.

12. The non-transitory computer-readable storage of claim 4, the process further comprising receiving, from the add-on management system, an update to a browser add-on previously installed on the user computing device.

13. A computer-implemented method comprising:
as implemented by an add-on management system comprising one or more computing devices,
establishing communications with a plurality of user computing devices configured to permit remote management, by the add-on management system, of browser add-ons used by the plurality of user computing devices, wherein the plurality of user computing devices are separate from the add-on management system;
obtaining a copy of a browser add-on based at least partly on the browser add-on being used by a first user computing device of the plurality of user computing devices;
executing the copy of the browser add-on;
analyzing execution of the copy of the browser add-on during performance of one or more operations;
determining, based at least partly on analyzing the execution of the copy of the browser add-on, whether the browser add-on is permitted to be used on at least a second user computing device of the plurality of user computing devices; and
instructing the second user computing device regarding usage of the browser add-on.

14. The computer-implemented method of claim 13, wherein the browser add-on comprises a plug-in, snap-in, extension, toolbar, widget, skin or theme.

15. The computer-implemented method of claim 13, wherein executing the copy of the browser add-on comprises executing the browser add-on in a sandbox.

16. The computer-implemented method of claim 13, wherein the copy of the browser add-on is obtained from an add-on server or a user computing device of the plurality of user computing devices.

17. The computer-implemented method of claim 16, wherein the copy of the browser add-on is obtained from an approved add-on server, and wherein the approved add-on server is different than an add-on server from which the first user computing device obtained the browser add-on.

18. The computer-implemented method of claim 13, further comprising maintaining a repository of trusted browser add-ons, wherein individual browser add-ons are included in the repository based at least partly on information regarding the individual browser add-ons received from at least a portion of the plurality of user computing devices.

19. The computer-implemented method of claim 13, wherein determining whether the browser add-on is permitted to be used on the second user computing device comprises determining to block usage of the browser add-on based at least partly on information regarding an operational characteristic of the browser add-on.

20. The computer-implemented method of claim 13, wherein determining whether the browser add-on is permitted to be used on the second user computing device comprises determining to block usage of the browser add-on on second user computing device based at least partly on information regarding a user of the second user computing device.

21. The computer-implemented method of claim 13, wherein instructing the second user computing device regarding usage of the browser add-on comprises providing approval to use the add-on.

22. The computer-implemented method of claim 13, wherein instructing the second user computing device regarding usage of the browser add-on comprises instructing the second user computing device to use an alternative add-on.

23. The computer-implemented method of claim 22, wherein determining whether the browser add-on is permitted to be used comprises identifying the alternative add-on using information regarding the browser add-on and a cross-reference list.

24. The computer-implemented method of claim 13, further comprising:
obtaining an inventory of browser add-ons installed on the first user computing device of the plurality of user computing devices, wherein the first user computing device has been disconnected from an enterprise network for a period of time; and
determining, based at least partly on the inventory, whether to permit the first user computing device to use the enterprise network.

25. The system of claim 1, wherein analyzing execution of the copy of the first browser add-on comprises using a browser API of a browser application to collect performance data about execution of the copy of the first browser add-on in the browser application.

26. The system of claim 1, wherein analyzing execution of the copy of the first browser add-on is performed in response to obtaining the information.

27. The computer-implemented method of claim 13, wherein instructing the second user computing device regarding usage of the browser add-on is performed without receiving a request from the second user computing device regarding the browser add-on.

* * * * *